United States Patent
Hahn et al.

(10) Patent No.: US 11,641,353 B2
(45) Date of Patent: *May 2, 2023

(54) HOUSEHOLD APPLIANCE COMMISSIONING

(71) Applicant: Haier US Appliance Solutions, Inc., Wilmington, DE (US)

(72) Inventors: Janghwan Hahn, Louisville, KY (US); Weston Spalding, Louisville, KY (US)

(*) Notice: Subject to any disclaimer, the term of this patent is extended or adjusted under 35 U.S.C. 154(b) by 90 days.

This patent is subject to a terminal disclaimer.

(21) Appl. No.: 17/093,798

(22) Filed: Nov. 10, 2020

(65) Prior Publication Data

US 2022/0150244 A1 May 12, 2022

(51) Int. Cl.
*H04L 9/40* (2022.01)
*H04L 12/28* (2006.01)
*H04L 67/00* (2022.01)

(52) U.S. Cl.
CPC ...... *H04L 63/0876* (2013.01); *H04L 12/2809* (2013.01); *H04L 12/2832* (2013.01); *H04L 63/0823* (2013.01); *H04L 67/34* (2013.01); *G05B 2219/2642* (2013.01); *H04L 2012/285* (2013.01); *H04L 2012/2841* (2013.01); *H04L 2012/2849* (2013.01)

(58) Field of Classification Search
CPC .............. H04L 12/2809; H04L 12/2832
See application file for complete search history.

(56) References Cited

U.S. PATENT DOCUMENTS

| | | | |
|---|---|---|---|
| 10,257,686 B2 | 4/2019 | Logue et al. | |
| 10,419,907 B2 | 9/2019 | Redding et al. | |
| 2013/0016629 A1* | 1/2013 | Mallik | H04W 8/005 370/255 |
| 2014/0006569 A1* | 1/2014 | Ferrazzini | H04L 12/2809 709/220 |
| 2016/0378082 A1 | 12/2016 | Fisher et al. | |
| 2018/0084403 A1* | 3/2018 | Kode | H04W 12/04 |
| 2018/0159958 A1 | 6/2018 | Olive et al. | |
| 2018/0288067 A1* | 10/2018 | Zehler | H04L 63/08 |
| 2020/0014685 A1 | 1/2020 | Hardy et al. | |

FOREIGN PATENT DOCUMENTS

CN 104767768 A 7/2015
WO WO2016/172538 A1 10/2016

* cited by examiner

*Primary Examiner* — Esther B. Henderson

(57) ABSTRACT

A method of commissioning a domestic appliance may include receiving, from a user interface of an existing household appliance, a request to add a new household appliance to the user account. The method may further include scanning for the new household appliance with the existing household appliance and establishing a direct connection from the existing household appliance to the new household appliance. The method may still further include obtaining a provisioning token from a remote database with the existing household appliance and transmitting the provisioning token from the existing household appliance to the new household appliance via the direct connection.

20 Claims, 5 Drawing Sheets

HOUSEHOLD APPLIANCE COMMISSIONING

FIELD OF THE INVENTION

The present subject matter relates generally to domestic appliances that can connect to a home network or a remote network such as the internet, and more particularly, to improved commissioning of such appliances to a user account.

BACKGROUND OF THE INVENTION

Domestic (e.g., household) appliances are used generally for a variety of tasks by a variety of users. For example, a household may include such appliances as laundry appliances (e.g., a washing machine or dryer appliance), kitchen appliances (e.g., a refrigerator, a microwave, a coffee maker, etc.), along with room air conditioners and various other appliances.

Some domestic appliances can also include features for connecting to and communicating over a secure wireless network. Such communication may provide connected features on the domestic appliances to permit the domestic appliance to communicate with a personal device, smart home systems, or a remote database such as a cloud server.

Existing domestic appliances that can connect to a secure wireless network generally require multiple processes using multiple user interfaces in order to establish a connection or association, in particular an initial connection or association, between the domestic appliance and a user account. For instance, in order to commission an appliance, a user may be required to connect an existing device, such as a phone, to the appliance via a temporary connection while the user performs certain steps on the existing device. In particular, in existing domestic appliances, a user must select a local wireless network (e.g., WI-FI® network) through which the appliance may connect to on a continuous basis. If the local wireless network is restricted by a password or access phrase, the user will also be required to provide the correct password to access the local wireless network (e.g., as a network credential). Although such passwords may be useful in securing or protecting the network, it can be difficult for users to remember and correctly provide (e.g., type) the password. These difficulties may greatly reduce a user's satisfaction with the appliance and hinder use of the appliance. Moreover, the difficulties may be especially magnified if a user has multiple appliances. If multiple appliances are being commissioned by a service person, the tedious repetition of reentering passwords for each appliance may be costly and inefficient.

Accordingly, there exists a need for an appliance that can be connected to a secured wireless network and added to a user account in an easier or more secure manner.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of commissioning a domestic appliance is provided. The method may include receiving, from a user interface of an existing household appliance, a request to add a new household appliance to the user account. The method may further include scanning for the new household appliance with the existing household appliance and establishing a direct connection from the existing household appliance to the new household appliance. The method may still further include obtaining a provisioning token from a remote database with the existing household appliance and transmitting the provisioning token from the existing household appliance to the new household appliance via the direct connection.

In another exemplary aspect of the present disclosure, a method of commissioning a domestic appliance is provided. The method may include receiving, from a user interface of an existing household appliance, a request to add a new household appliance to the user account. The method may further include scanning for the new household appliance with the existing household appliance and establishing a direct connection from the existing household appliance to the new household appliance. The method may still further include obtaining a provisioning token from a remote database with the existing household appliance and transmitting network credentials for the wireless network and the provisioning token from the existing household appliance to the new household appliance via the direct connection. The method may yet further include initiating connection to the wireless network using the transmitted network credentials and associating the new household appliance with the user account using the transmitted provisioning token.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
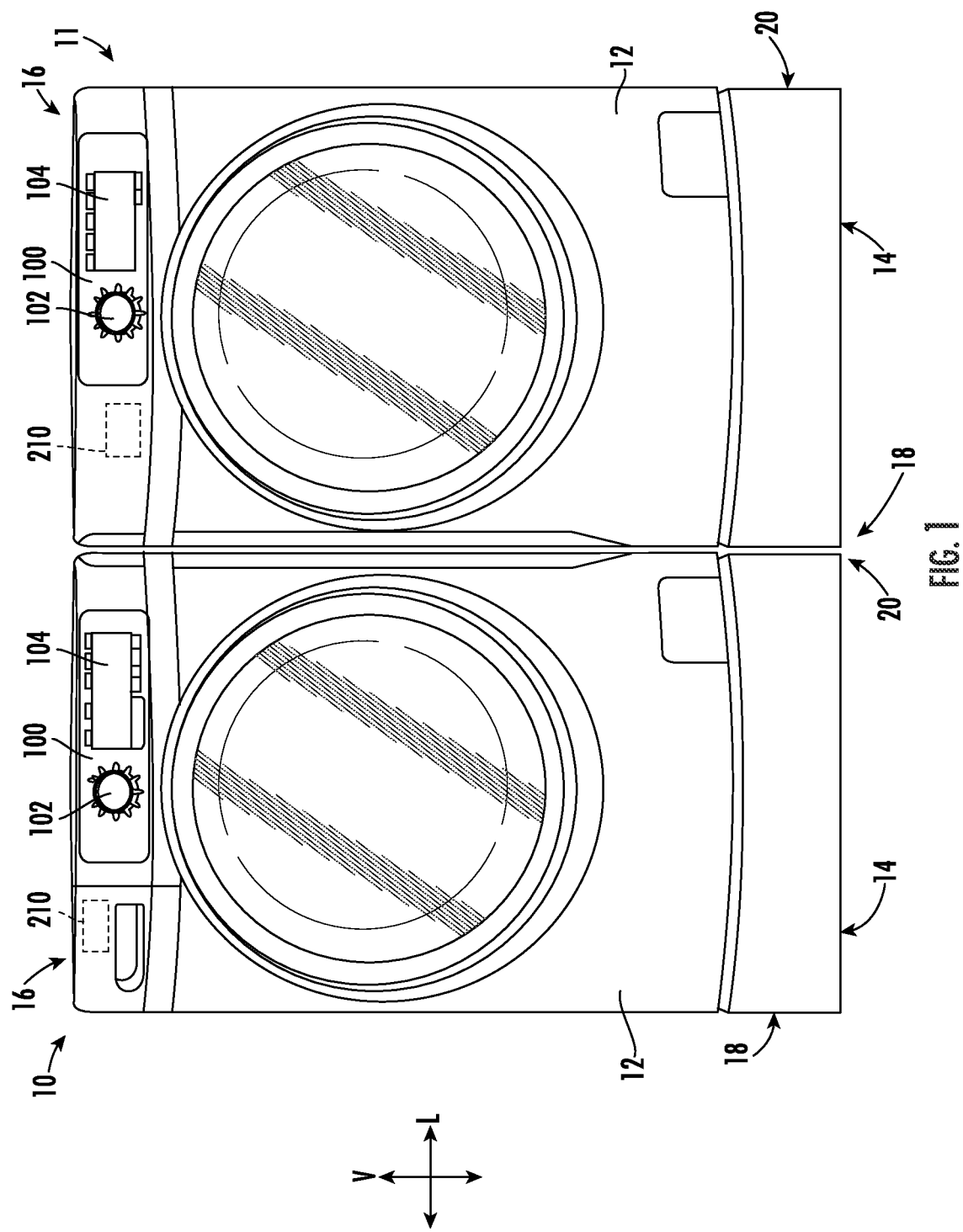
FIG. 1 provides a front, elevation view of laundry appliances in accordance with exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
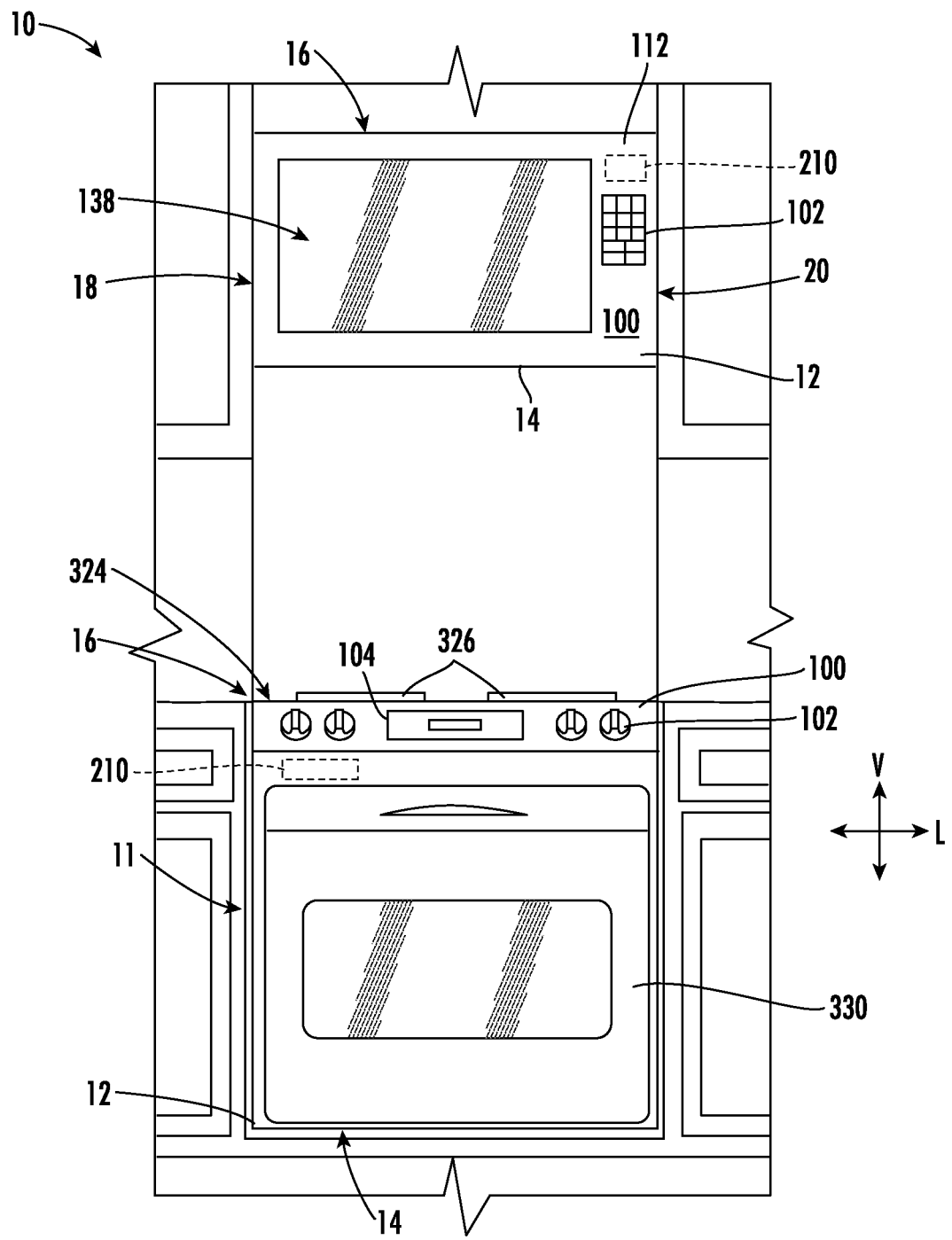
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a primary or first appliance 10 and one or more secondary or second appliances 11, may be provided. The illustrated group of two appliances is provided by way of example only. Various embodiments of the present subject matter may also include additional (e.g., three or more) appliances, such as one primary appliance 10 and two or more secondary appliances 11.

As generally shown throughout FIGS. 1 and 2, each appliance 10 and 11 includes a cabinet 12 that defines a vertical direction V, a lateral direction L and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102 that may be positioned on an exterior of the cabinet 12. The user input device 102 is generally positioned proximate to the user interface panel 100, and in some embodiments, the user input device 102 may be positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may, for example, provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs or the like, such as general or special purpose microprocessors operable to execute programming instructions or micro-control code associated with operation of the appliance 10 or 11. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations and the like and storing relevant data as disclosed herein). It should be noted that controllers 210 as disclosed herein are capable of and may be operable to perform any methods and associated method steps (e.g., as, or as part of, a provisioning operation) as disclosed herein.

In some embodiments, a pair of laundry appliances may be provided as the first appliance 10 or the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliance where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components which operate to produce the electromagnetic radiation, as is generally understood. For example, the microwave oven appliance may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance 1. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where improved ease of commissioning the appliance is desired. Thus, it will be understood that the present subject matter is not limited to any particular domestic appliance.

Figure 3:
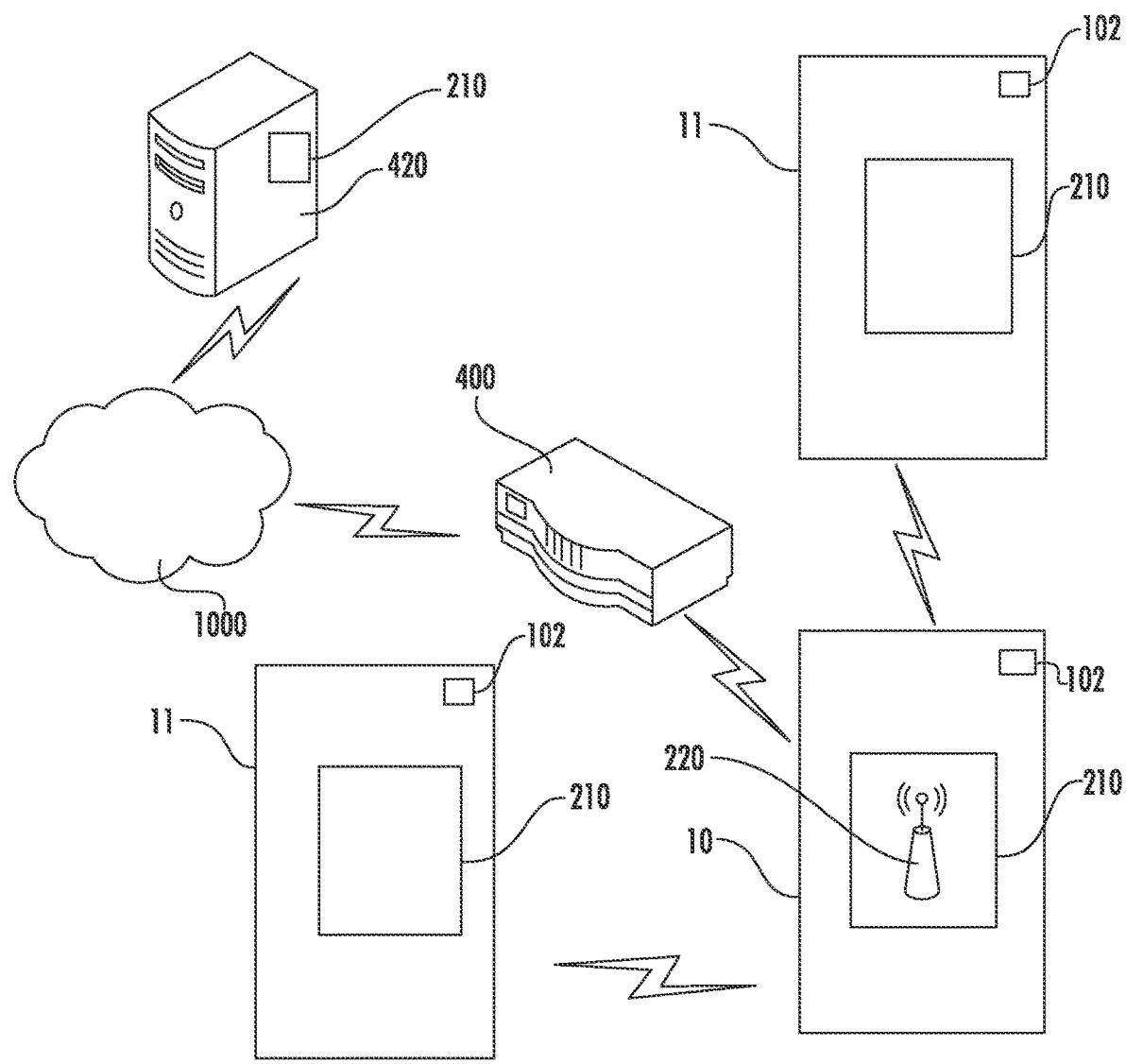
FIG. 3 provides a schematic view of an appliance being commissioned with a user device according to exemplary embodiments of the present disclosure.
Figure 4:
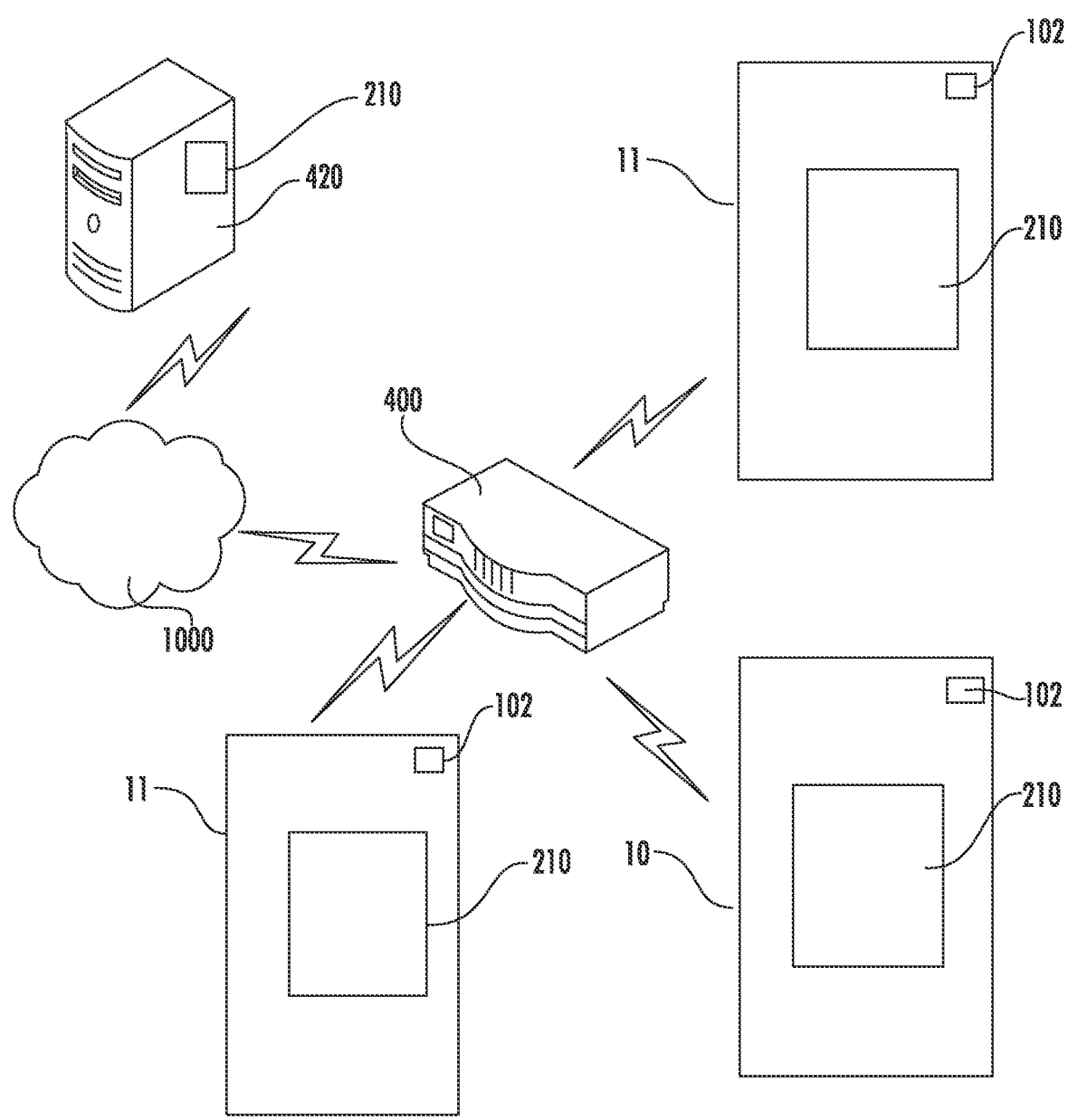
FIG. 4 provides a schematic view of an appliance prior to being commissioned according to exemplary embodiments of the present disclosure.

Turning now generally to FIGS. 3 and 4, an appliance (e.g., first appliance 10 or second appliance 11) may be configured to communicate with one or more separate, external devices. For instance, appliances 10, 11 may be configured to communicate with each other or a remote server 420, either directly or via one or more intermediate networks (e.g., a wide area network 1000, such as the internet). In other words, a controller 210 of one appliance (e.g., second appliance 11) may be configured to communication with a separate controller 210 of another appliance (first appliance 10), In some embodiments, the appliances 10 and 11 can access the wide area network 1000 via an access point, such as a modem or router 400, which may be part of a local, wireless network (e.g., WI-FI® or wireless network having a frequency between 2.4 GHz and 6 GHz).

Methods and systems according to the present disclosure advantageously provide a smoother and more convenient user experience when commissioning one or more new domestic appliances (e.g., second appliance(s) 11). For example, commissioning the second appliance 11 may include connecting a second appliance 11 to a local wireless (e.g., RF, WI-FI®, etc.) network for the first time or adding a second appliance 11 to a user account on the remote server 420.

FIG. 3 provides a schematic view of multiple new household appliances or second household appliances 11 directly connected to an existing household appliance or first household appliance 10 during a provisioning or commissioning operation (e.g., for the first time). Thus, one or more of the second household appliances 11 may be a new household appliance 11 and the first household appliance 10 may be an existing or already-provisioned appliance 10. The appliance 10 may already be logged into and connected to the local wireless network (e.g., WI-FI® network) maintained by router 400 and provisioned to a user account on the remote database 420. As shown, in FIG. 3, the new appliance 11 may connect to the existing household appliance 10 via a wireless module 220 provided on the first household appliance 10.

It should be understood that three appliances (e.g., one existing appliance 10 and two new appliances 11) are illustrated by way of example only, in at least some embodiments, less than two (i.e., one) or more than two (i.e., three new or more) new appliances may be commissioned at the same time.

In some embodiments, commissioning of (e.g., a provisioning operation for) a new appliance (e.g., a second appliance 11) is initiated by requesting to add the new appliance 11 to a user account and by manipulating a user input on a user interface 102 (e.g., pressing a button on the user interface 102) of first appliance 10. For example, a provisioning operation to commission the new household appliance 11 may include receiving a request to add the new appliance 11 to a user account on the user interface 102 of the existing household appliance 10. Optionally, multiple new appliances 11 may be selected at the same time.

Prior to or subsequent to manipulation of a user input at first appliance 10, the first appliance 10 may scan for an advertising beacon (e.g., BLUETOOTH® beacon) on or from the new appliance(s) 11 to indicate the presence and characteristics (e.g., a company identifier, device identifier, appliance type, signal strength, etc.) of the new appliance(s) 11. Once the scan identifies the new appliance(s) 11 (i.e., via the scanning), the existing appliance 10 (e.g., wireless module 220) may display information (e.g., one or more characteristics) of the new appliance(s) 11 on the user interface 102 of the existing appliance 10. From such information, a user may select which appliance(s) to commission (e.g., at the user interface 102 of the existing appliance 10). Thus, at the existing appliance 10, a user may initiate the request to add the new household appliance(s) 11 to the user's account via a touchscreen, button, or other suitable input such issuing a verbal command to a voice-enabled appliance. Once selected, the existing appliance 10 may present instructions for one or more user inputs to engage on the user interface 102 of each new appliance 11. After the user engages the instructed user input of the new appliances 10, the existing appliance 10 may establish a discrete direct connection to each of the selected new household appliances 11. The direction connection may be a secure peer-to-peer connection, such as a secure low-power RF connection (e.g., BLUETOOTH® connection)

After the request to add the new household appliance(s) 11 to the user account is made at the existing appliance 10, the request may be transmitted from the existing household appliance 10 to the database 420 via the network 1000 (e.g., the internet or a cellular data network, etc.). When the database 420 receives the request to add the new appliances 11, the database 420 may then send a provisioning token for each of the new household appliances 11 to the existing, previously commissioned household appliance 10.

The existing household appliance 10 may transmit a request to the remote database 420 for a provisioning token associated with the user account. Such provisioning token may be used for the new household appliance(s) 11.

Through the secure direction connection, each new appliance 11 may then receive network credentials (e.g., as an SSID and password) for the wireless network or the provisioning token for the user account from the existing appliance 10.

The provisioning token may be sent from the remote database 420 to the new household appliance 11 through the wide area network 1000. For example, the database 420 may send the provisioning token to the device providing the wireless module 220 (i.e., the existing appliance 10) via the router 400 and wide area network 1000. The existing appliance 10 may then relay the provisioning token along with a network credential (e.g., a password for the user's home router 400) to the new appliance(s) 11 via the secure direct connection at the wireless module 220.

After receiving the network credential, a new appliance 11 may disconnect from the wireless module 220 and connect directly to the network (e.g., may connect directly to the user's home WI-FI® network via the router 400), as illustrated, for example, in FIG. 4. Once connected directly to the router 400, the second appliance 11 may then connect to the remote server 420 via the router 400 and wide area network 1000. Thus, the second appliance 11 may be able to communicate directly with the remote server 420 through the wide area network 1000 and wireless network of the router 400 subsequent to receiving the network credential (i.e., subsequent to the first appliance 10 transmitting the network credential to the second appliance 11). Additionally or alternatively, the second appliance 11 (e.g., controller 210 thereof) may transmit the account token to the remote server 420. The remote server 420 may use the account token to verify or permit the connection to second appliance 11. The server 420 may then associate the second appliance 11 with the user account.

Figure 5:
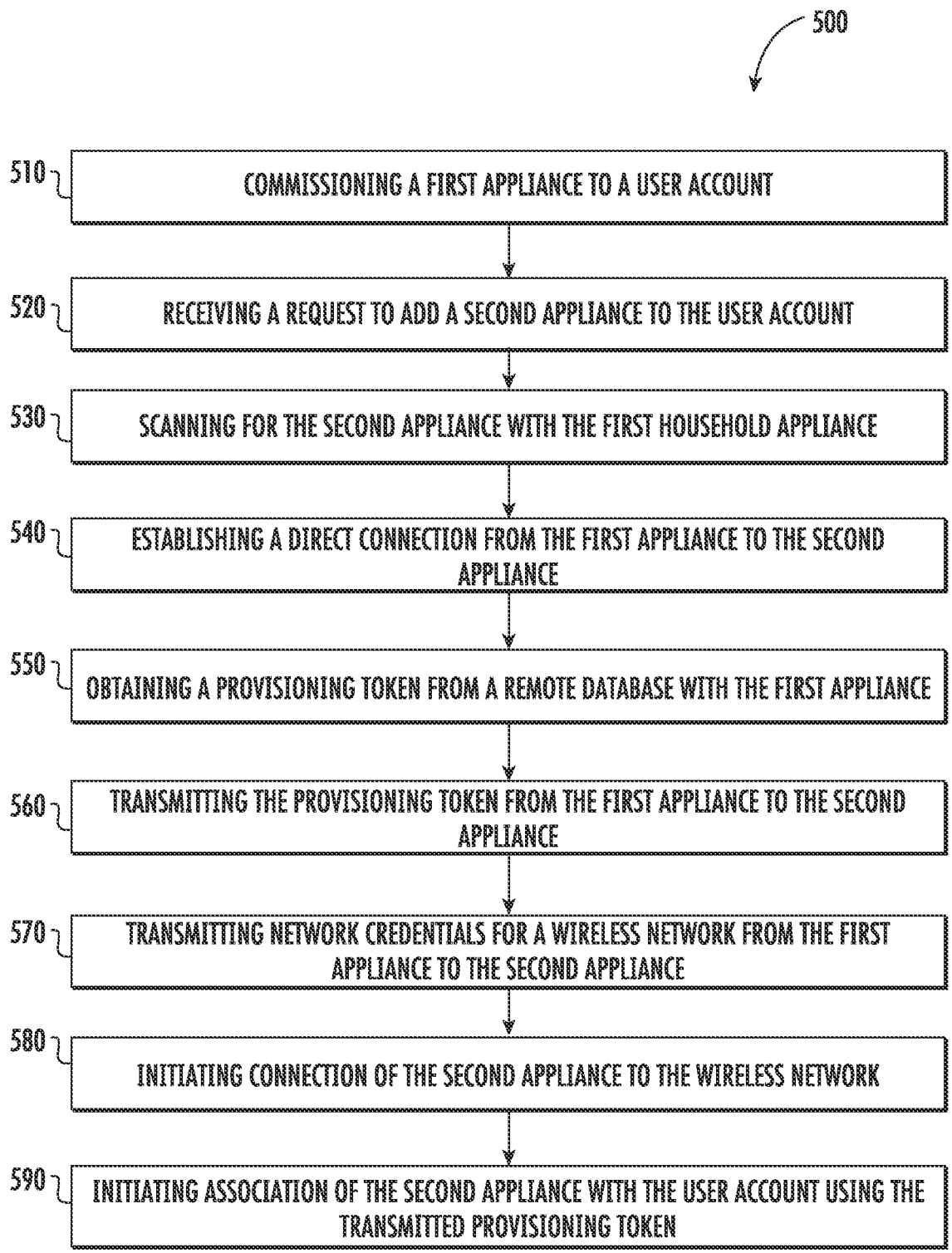
FIG. 5 provides a flow chart illustrating a method of commissioning an appliance according to exemplary embodiments of the present disclosure.

Turning now to FIG. 5, various methods may be provided for use of a system, appliance (e.g., existing appliance 11 or remote server (e.g., remote server 420) in accordance with the present disclosure. In general, the various steps of methods as disclosed herein may, in exemplary embodiments, be performed by one or more controllers 210 (e.g., of existing appliance 11 or remote server 420) as part of an operation that a controller 210 is configured to execute (e.g., as, or as part of, a provisioning operation). During such methods, the controller 210 may receive inputs and transmit outputs from various other components or external devices. In particular, the present disclosure is further directed to methods, such as commissioning a domestic appliance (e.g., second appliance 11). In certain embodiments, such methods may advantageously facilitate connecting an appliance to a secured, local, wireless network (e.g., local network through a router 400) or added to a user account in an easy and secure manner.

Turning especially to FIG. 5, the method 500 may be performed by a controller, for example, of an existing appliance (e.g., household appliance). At 510, the method 500 includes commissioning a first appliance. Generally, such a commissioning would include connecting to a remote server, such as through a wide area network and wireless network of a router. Optionally, a user may be required to manually supply a network password (e.g., to connect to the wireless network) or user identifier associated with a user account on the remote server, as would be understood.

At 520, the method 500 includes receiving, from a user interface of the existing household appliance, a request to add the new household appliance to the user account. For example, the method 500 may include providing a user instruction on the user interface of the existing household appliance to select one or more new household appliances using a provisioning button. For instance, the user may select a single new appliance or a plurality of discrete new appliances at the same time at the existing appliance. Optionally, instructions may be displayed for one or more user inputs that should then be selected on the new appliance (e.g., to establish a direct connection). For the purposes of the method 500, it is understood that any discussion of one new appliance may generally be applicable to each of a plurality of new appliances.

In some embodiments, the user interface of the existing household appliance from which the provisioning command is received may be or include the provisioning button. The provisioning button, as well as each other user input described herein, may, in various embodiments, be provided as a physical button, such as a push button or a touch pad button, or as a virtual button, such as a soft key or a selection on an interactive menu provided via a touchscreen interface, among other possible examples of a button.

At 530, the method 500 includes scanning for the new household appliance with the existing household appliance. For instance, the scan for an advertising beacon on or from the new appliance may be performed from the new household appliance, as described above. In some embodiments, the advertising beacon includes a BLUETOOTH® beacon, which is generally visible to a BLUETOOTH® module (e.g., on the existing appliance) and indicates one or more characteristics of the new appliance. Such a beacon may be initiated (e.g., automatically) when power is supplied to the new appliance.

In some embodiments, 530 is initiated (i.e., starts) prior to 520. For instance, 530 may be initiated or occur at a regular or programmed interval to detect new appliances that may have been activated within close proximity to the existing appliance. Additionally or alternatively, 530 may be initiated in response to 510. Thus, as soon as the existing appliance is commissioned, it may begin scanning for additional or new appliances.

At 540, the method 500 includes establishing a direct connection from the existing household appliance to the new household appliance. For instance, the direct connection may be initiated following the scan at 530 (e.g., in response to recognizing or otherwise detecting the new appliance during the scan). Optionally, a user may be required to select one or more user inputs (e.g., a provisioning button) on the new appliance in order to permit the existing appliance to directly connect to the new appliance. The selection of such user inputs may be prompted by instructions on the user interface of the existing appliance after the scan at 530 is complete. The connection may be a secure connection between the new household appliance and the existing household appliance. In various embodiments, the direct connection from the new household appliance to the existing household appliance is a peer-to-peer connection, such as a BLUETOOTH® connection. In alternative embodiments, establishing the direct connection from the new household appliance to the existing household appliance may include connecting the new household appliance to the existing household appliance as a client.

At 550, the method 500 includes obtaining a provisioning token from a remote database with the existing household appliance. For instance, the provisioning token may be obtained for the new appliance from the remote database connected to the existing appliance through the wireless network(s), as described above.

At 560, the method 500 includes transmitting the provisioning token from the existing household appliance to the new household appliance via the direct connection. In particular, once the provisioning token is received at the existing appliance, 560 may be initiated such that the new appliance can receive the provisioning token.

At 570, the method 500 includes transmitting network credentials for the wireless network from the existing household appliance to the new household appliance via the direct connection. Optionally, 570 may occur with 560 such that the network credentials are delivered to the new appliance with the provisioning token. Alternatively, 560 may occur separately from 570 such that multiple discrete transmissions are made from the existing appliance to the new appliance.

At 580, the method 500 includes initiating connection of the new appliance to the wireless network. For instance, in response to receiving the network credential, the new appliance may be prompted to apply the credentials (e.g., at the router). Thus, the new appliance may apply the network credential to connect the new appliance directly to a corresponding local wireless network (e.g., the local network provided by the router). Moreover, as described above, the existing appliance may already be connected directly to the local wireless network (i.e., the same wireless network as the new appliance).

At 590, the method 500 includes associating the new appliance with the user account using the transmitted provisioning token. Thus, the new appliance(s) may be commissioned and associated with user account, similar to the existing appliance, and as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of provisioning a new household appliance using an existing household appliance, the existing household appliance connected to a wireless network and provisioned to a user account, the method comprising:
   receiving, from a user interface of the existing household appliance, a request to add the new household appliance to the user account;
   scanning for the new household appliance with the existing household appliance;
   establishing a direct connection from the existing household appliance to the new household appliance;
   obtaining a provisioning token from a remote database with the existing household appliance, obtaining the provisioning token comprising
      transmitting a token request from the existing household appliance to the remote database, and
      receiving the provisioning token at the existing household appliance from the remote database; and
   transmitting the provisioning token from the existing household appliance to the new household appliance via the direct connection.

2. The method of claim 1, further comprising:
   associating the new household appliance with the user account using the transmitted provisioning token.

3. The method of claim 2, further comprising terminating the direct connection on the existing household appliance after connecting the new household appliance to the wireless network.

4. The method of claim 1, further comprising:
   transmitting network credentials for the wireless network; and
   initiating connection of the new household appliance to the wireless network using the transmitted network credentials.

5. The method of claim 1, wherein scanning occurs prior to receiving the request.

6. The method of claim 1, wherein the direct connection from the new household appliance to the existing household appliance is a peer-to-peer connection.

7. The method of claim 1, wherein the user interface of the existing household appliance comprises a touch screen.

8. The method of claim 1, wherein the new household appliance comprises a plurality of discrete new household appliances.

9. The method of claim 1, further comprising:
commissioning the existing household appliance to the user account prior to receiving the request to add the new household appliance.

10. The method of claim 9, wherein scanning is in response to commissioning the existing household appliance.

11. A method of provisioning a new household appliance using an existing household appliance, the existing household appliance connected to a wireless network and provisioned to a user account, the method comprising:
receiving, from a user interface of the existing household appliance, a request to add the new household appliance to the user account;
scanning for the new household appliance with the existing household appliance;
establishing a direct connection from the existing household appliance to the new household appliance;
obtaining a provisioning token from a remote database with the existing household appliance obtaining the provisioning token comprising
transmitting a token request from the existing household appliance to the remote database, and
receiving the provisioning token at the existing household appliance from the remote database;
transmitting network credentials for the wireless network and the provisioning token from the existing household appliance to the new household appliance via the direct connection;
initiating connection to the wireless network using the transmitted network credentials; and
associating the new household appliance with the user account using the transmitted provisioning token.

12. The method of claim 11, further comprising:
terminating the direct connection on the existing household appliance after connecting the new household appliance to the wireless network.

13. The method of claim 11, wherein scanning occurs prior to receiving the request.

14. The method of claim 11, wherein the direct connection from the new household appliance to the existing household appliance is a peer-to-peer connection.

15. The method of claim 11, wherein the user interface of the existing household appliance comprises a touch screen.

16. The method of claim 11, wherein the new household appliance comprises a plurality of discrete new household appliances.

17. The method of claim 11, further comprising:
commissioning the existing household appliance to the user account prior to receiving the request to add the new household appliance.

18. The method of claim 17, wherein scanning is in response to commissioning the existing household appliance.

19. A method of provisioning a new household appliance using an existing household appliance, the existing household appliance connected to a wireless network and provisioned to a user account, the method comprising:
commissioning the existing household appliance to the user account prior to receiving the request to add the new household appliance;
scanning for the new household appliance with the existing household appliance;
receiving, from a user interface of the existing household appliance, a request to add the new household appliance to the user account following commissioning the existing appliance and scanning for the new household appliance;
establishing a direct connection from the existing household appliance to the new household appliance, the direct connection being a peer-to-peer connection;
obtaining a provisioning token from a remote database with the existing household appliance, obtaining the provisioning token comprising
transmitting a token request from the existing household appliance to the remote database, and
receiving the provisioning token at the existing household appliance from the remote database;
transmitting network credentials for the wireless network and the provisioning token from the existing household appliance to the new household appliance via the direct connection;
initiating connection to the wireless network using the transmitted network credentials;
associating the new household appliance with the user account using the transmitted provisioning token; and
terminating the direct connection on the existing household appliance after connecting the new household appliance to the wireless network.

20. The method of claim 19, wherein scanning is in response to commissioning the existing household appliance.

* * * * *